US012431638B2

(12) United States Patent
Ikeda et al.

(10) Patent No.: US 12,431,638 B2
(45) Date of Patent: Sep. 30, 2025

(54) TERMINAL-EQUIPPED ELECTRIC WIRE AND CONNECTOR-EQUIPPED ELECTRIC WIRE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Yoshitaka Ikeda, Mie (JP); Takuji Otsuka, Mie (JP); Kosuke Sone, Mie (JP); Keisuke Kondo, Mie (JP); Takahiro Maruyama, Mie (JP); Yasuto Takeda, Mie (JP); Tomoyuki Kondo, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 455 days.

(21) Appl. No.: 17/919,740

(22) PCT Filed: Apr. 5, 2021

(86) PCT No.: PCT/JP2021/014463
§ 371 (c)(1),
(2) Date: Oct. 18, 2022

(87) PCT Pub. No.: WO2021/215230
PCT Pub. Date: Oct. 28, 2021

(65) Prior Publication Data
US 2023/0145632 A1 May 11, 2023

(30) Foreign Application Priority Data
Apr. 20, 2020 (JP) ................................ 2020-074627

(51) Int. Cl.
*H01R 4/18* (2006.01)
*H01B 7/18* (2006.01)
(Continued)

(52) U.S. Cl.
CPC ............... *H01R 4/184* (2013.01); *H01B 7/18* (2013.01); *H01R 11/11* (2013.01); *H01R 13/5219* (2013.01)

(58) Field of Classification Search
CPC .......... H01R 4/184; H01R 4/18; H01R 11/11; H01R 13/5219
(Continued)

(56) References Cited

U.S. PATENT DOCUMENTS 7,901,240 B2 * 3/2011 Jackson ............... H01R 4/5025 439/465
8,382,533 B2 * 2/2013 Pavlovic .............. H01R 13/187 439/840
(Continued)

FOREIGN PATENT DOCUMENTS

JP 2006-040624 A 2/2006

*Primary Examiner* — Harshad C Patel
(74) *Attorney, Agent, or Firm* — Venjuris, P.C.

(57) ABSTRACT

It is an object to provide a technique with which the length of a portion of a terminal-equipped electric wire disposed in a cavity of a connector housing can be shortened. A terminal-equipped electric wire including: a coated electric wire including a conductor core wire and an insulation coating that covers the conductor core wire; a joint terminal connected to the conductor core wire; a connector terminal to be connected to a partner terminal; a single-core relay conductor in which one end thereof is connected to the joint terminal and another end thereof is connected to the con-
(Continued)

nector terminal; and a sealing member that covers an intermediate portion of the relay conductor. A wire barrel of the joint terminal is crimped to the conductor core wire and the relay conductor at the same position in a longitudinal direction of the joint terminal.

10 Claims, 7 Drawing Sheets

(51) Int. Cl.
*H01R 11/11* (2006.01)
*H01R 13/52* (2006.01)

(58) Field of Classification Search
USPC .......................................................... 439/877
See application file for complete search history.

(56) References Cited

U.S. PATENT DOCUMENTS

| | | | | |
|---|---|---|---|---|
| 8,454,378 | B2 * | 6/2013 | Osterhart | H01R 24/84 439/284 |
| 9,071,008 | B2 * | 6/2015 | Zillinger | H01R 13/533 |
| 9,287,634 | B2 * | 3/2016 | Kawamura | H01R 4/206 |
| 10,374,328 | B2 * | 8/2019 | Bhagyanathan-Sathlanathan | H01R 4/185 |
| 11,205,865 | B2 * | 12/2021 | Hashimoto | H01B 7/00 |
| 11,843,194 | B2 * | 12/2023 | Jo | H01R 4/5075 |
| 11,843,214 | B2 * | 12/2023 | Jo | H01R 4/646 |
| 2005/0266731 | A1 * | 12/2005 | Kobayashi | H01R 31/085 439/654 |
| 2015/0017845 | A1 | 1/2015 | Tomita et al. | |
| 2020/0194907 | A1 | 6/2020 | Washio et al. | |
| 2020/0259275 | A1 | 8/2020 | Hashimoto et al. | |

* cited by examiner

TERMINAL-EQUIPPED ELECTRIC WIRE AND CONNECTOR-EQUIPPED ELECTRIC WIRE

CROSS REFERENCE TO RELATED APPLICATIONS

This application is a national phase of PCT application No. PCT/JP2021/014463, filed on 5 Apr. 2021, which claims priority from Japanese patent application No. 2020-074627, filed on 20 Apr. 2020, all of which are incorporated herein by reference.

TECHNICAL FIELD

The present disclosure relates to a terminal-equipped electric wire and a connector-equipped electric wire.

BACKGROUND

Patent Document 1 discloses a terminal-equipped electric wire disposed in an insertion hole provided in a connector case. In the terminal-equipped electric wire disclosed in Patent Document 1, an electric wire and a connector terminal are electrically connected to each other via a relay conductor. The insertion hole is liquid-sealed by a sealing member placed onto the relay conductor.

PRIOR ART DOCUMENT

Patent Document

Patent Document 1: International Publication No. WO 2019/059301 A1

SUMMARY OF THE INVENTION

Problems to be Solved

There is a desire to shorten the length of the portion of the terminal-equipped electric wire disposed in an insertion hole.

Thus, it is an object to provide a technique with which the length of the portion of the terminal-equipped electric wire disposed in a cavity of a connector housing can be reduced.

Means to Solve the Problem

A terminal-equipped electric wire according to the present disclosure is a terminal-equipped electric wire including: a coated electric wire including a conductor core wire and an insulation coating that covers the conductor core wire; a joint terminal connected to the conductor core wire; a connector terminal to be connected to a partner terminal; a single-core relay conductor in which one end thereof is connected to the joint terminal and another end thereof is connected to the connector terminal; and a sealing member that covers an intermediate portion of the relay conductor, wherein a wire barrel of the joint terminal is crimped to the conductor core wire and the relay conductor at the same position in a longitudinal direction of the joint terminal.

Effect of the Invention

With the present disclosure, the length of the portion of the terminal-equipped electric wire disposed in a cavity of a connector housing can be reduced.

DETAILED DESCRIPTION TO EXECUTE THE INVENTION

Description of Embodiments of Present Disclosure

Figure 1:
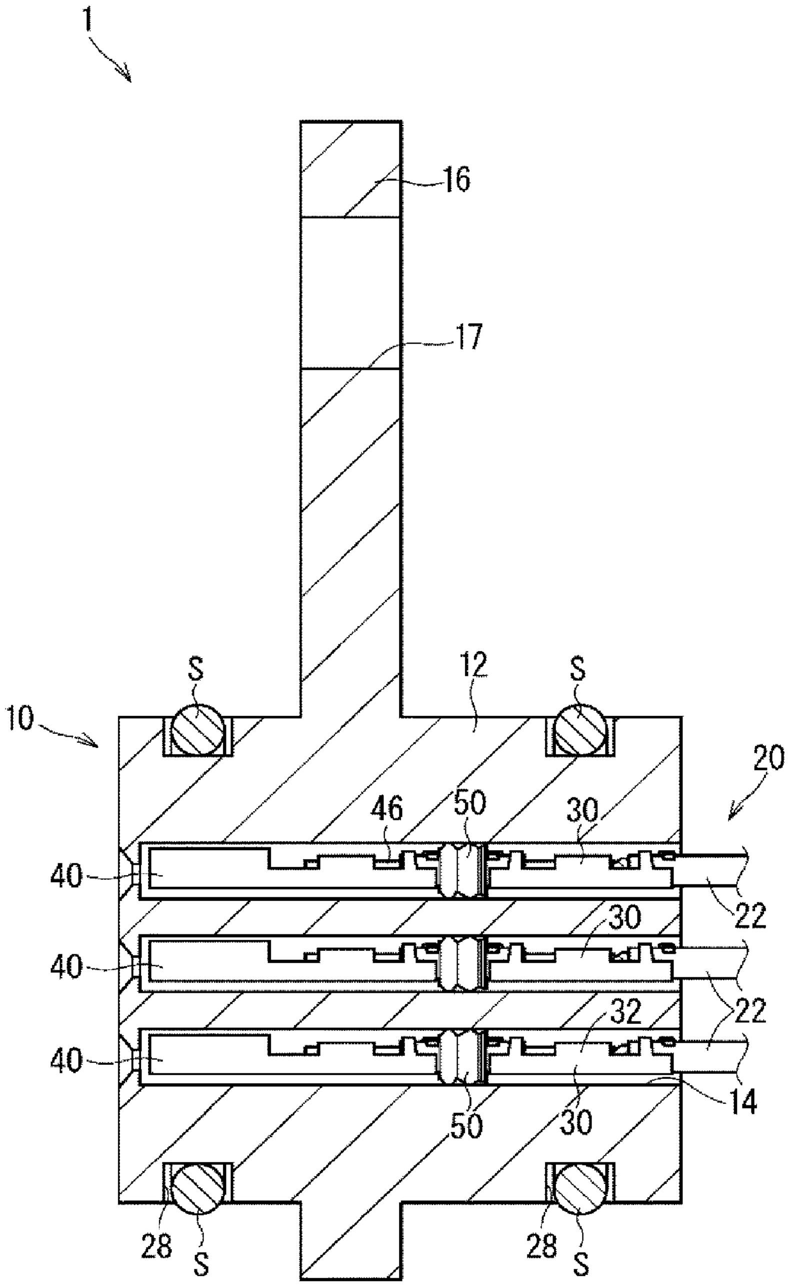
FIG. 1 is a cross-sectional diagram showing a terminal-equipped electric wire and a connector-equipped electric wire according to Embodiment 1.

First, embodiments of the present disclosure will be listed and described below.

A terminal-equipped electric wire according to the present disclosure is as follows.

(1) A terminal-equipped electric wire including: a coated electric wire including a conductor core wire and an insulation coating that covers the conductor core wire; a joint terminal connected to the conductor core wire; a connector terminal to be connected to a partner terminal; a single-core relay conductor in which one end thereof is connected to the joint terminal and another end thereof is connected to the connector terminal; and a sealing member that covers an intermediate portion of the relay conductor, wherein a wire barrel of the joint terminal is crimped to the conductor core wire and the relay conductor at the same position in a longitudinal direction of the joint terminal. The wire barrel of the joint terminal is crimped to the conductor core wire and the relay conductor at the same position in the longitudinal direction of the joint terminal. Thus, compared to a case where wire barrels are respectively crimped to the conductor core wire and the relay conductor at different positions in the longitudinal direction of the joint terminal, the joint terminal can be shortened. Accordingly, the length of the portion of the terminal-equipped electric wire disposed in the cavity of the connector housing can be shortened.

(2) In the terminal-equipped electric wire in (1), the conductor core wire and the relay conductor may be aligned in a height direction of the joint terminal at a portion where the conductor core wire and the relay conductor are crimped by the wire barrel. Thus, the conductor core wire and the relay conductor can be aligned in a crimping direction.

(3) In the terminal-equipped electric wire in (2), the conductor core wire, out of the conductor core wire and the relay conductor, may be located on a bottom portion side of the joint terminal. Thus, the relay conductor can cover the conductor core wire from above.

(4) In the terminal-equipped electric wire in (1), the conductor core wire and the relay conductor may be aligned in a width direction of the joint terminal at a portion where the conductor core wire and the relay conductor are crimped by the wire barrel. Accordingly, the conductor core wire and the relay conductor can be aligned in a direction orthogonal to the crimping direction.

(5) In the terminal-equipped electric wire in (4), the wire barrel includes a pair of crimping pieces, and one of the pair of crimping pieces may wrap around the conductor core wire and the other of the pair of crimping pieces may wrap around the relay conductor. Accordingly, the conductor core wire and the relay conductor can be crimped using separate crimping pieces.

(6) In the terminal-equipped electric wire in any one of (1) to (5), the sealing member may include a sealing body that is contactable with an inner surface of a cavity of a connector housing, and a crimp portion that is provided on one side of the sealing body, and the crimp portion may be crimped to one of the joint terminal and the connector terminal. Thus, compared to a case where the crimp portions are provided on two sides of the sealing body and the crimp portions on the two sides are respectively crimped to the joint terminal and the connector terminal, the sealing member can be shortened. Thus, the length of the portion of the terminal-equipped electric wire disposed in the cavity of the connector housing can be shortened.

(7) A connector-equipped electric wire according to the present disclosure is a connector-equipped electric wire including: a connector housing provided with a cavity, and the terminal-equipped electric wire according to any one of (1) to (6) housed in the cavity. The length of the portion of the terminal-equipped electric wire disposed in the cavity of the connector housing can be shortened. Thus the cavity itself can also be shortened and the size of the connector can be reduced.

DETAILED DESCRIPTION OF EMBODIMENT OF THE PRESENT DISCLOSURE

Specific examples of a terminal-equipped electric wire and a connector-equipped electric wire according to the present disclosure will be described below with reference to the drawings. Note that the present disclosure is not limited to these illustrative examples, but is indicated by the claims, and all changes that come within the meaning and range of equivalency of the claims are intended to be embraced therein.

Embodiment 1

A terminal-equipped electric wire and a connector-equipped electric wire including the same according to Embodiment 1 are described below. FIG. 1 is a cross-sectional view showing a terminal-equipped electric wire 20 and a connector-equipped electric wire 1 according to Embodiment 1. In FIG. 1, a connector housing 10 is cut along a plane that is parallel to the longitudinal direction of a cavity 14. FIG. 1 is not a cross-sectional view of the terminal-equipped electric wire 20.

The connector-equipped electric wire 1 includes the connector housing 10 and the terminal-equipped electric wire 20. The connector housing 10 is provided with the cavity 14. The leading end portion of the terminal-equipped electric wire 20 is housed at a predetermined position in the cavity 14 (hereinafter referred to as "housed state"). The terminal-equipped electric wire 20 is provided with a sealing member 50. In the housed state, the sealing member 50 is located at a predetermined sealing position (here, the position of an intermediate portion in the longitudinal direction of the cavity 14). In the housed state, one opening portion and another opening portion of the cavity 14 are liquid-sealed by the sealing member 50.

Connector Housing

The connector housing 10 includes a housing body 12. The cavity 14 is formed in the housing body 12. At least one cavity 14 is provided. Here, a plurality of cavities 14 are provided. The plurality of cavities 14 may be provided aligned in a plurality of rows and columns. The plurality of cavities 14 may be provided aligned in one row and in a plurality of columns.

The cavity 14 is formed so as to extend through the housing body 12. The one opening portion of the cavity 14 is open in one end surface of the housing body 12. The terminal-equipped electric wire 20 is inserted into the cavity 14 via the one opening portion. The other opening portion of the cavity 14 is open in another end surface of the housing body 12. The other opening portion is a portion through which a conductor pin provided on a male terminal is passed.

The example shown in FIG. 1 is an example of a case where the terminal of the terminal-equipped electric wire 20 housed in the cavity 14 is a female terminal. In this case, a conductor pin provided on a male terminal of a partner connector is inserted into the cavity 14 via the other opening portion. Then, the female terminal and the conductor pin provided on the partner male terminal are connected to each other in the cavity 14. Naturally, the terminal housed in the cavity 14 may be a male terminal. In this case, the conductor pin provided on the male terminal protrudes outside the cavity 14 via the other opening portion. Then the conductor pin provided on the male terminal and a partner female terminal are connected to each other outside the cavity 14. The other opening portion is formed larger than the conductor pin and smaller than the female terminal. Accordingly, the female terminal housed in the cavity 14 is kept from falling out from the other opening portion.

The connector housing 10 is provided with a vehicle attachment portion 16. The vehicle attachment portion 16 is provided so as to protrude outward from a side surface of the housing body 12. The vehicle attachment portion 16 is a portion for attaching the connector housing 10 to a vehicle. The vehicle attachment portion 16 is provided with a mounting hole 17. A bolt or the like is inserted into the mounting hole 17 to attach the vehicle attachment portion 16 to the vehicle. The mounting hole 17 may be provided with a metal ring or the like. The vehicle attachment portion 16 may be omitted from the connector housing 10.

Also, the connector hosing 10 is provided with seal member mounting portions 28. The seal member mounting portions 28 are provided such that portions of side surfaces of the housing body 12 are annularly recessed. The seal member mounting portions 28 are respectively provided on two sides of the vehicle attachment portion 16. A seal member S such as an O-ring is mounted to each seal member mounting portion 28. The seal member mounting portions 28 may be omitted from the connector housing 10.

The connector housing 10 is made of a material that has insulative properties such as resin. The connector housing 10 is an injection molded component, for example.

Terminal-Equipped Electric Wire

Figure 2:
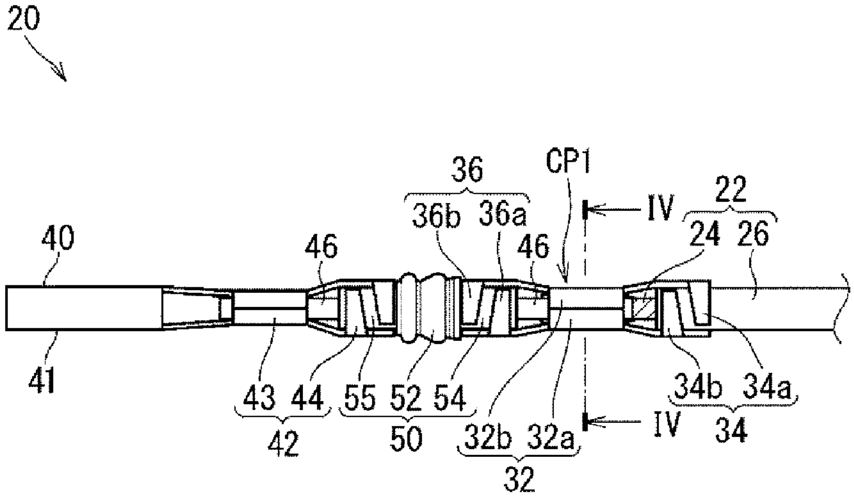
FIG. 2 is a plan view showing the terminal-equipped electric wire according to Embodiment 1.
Figure 3:
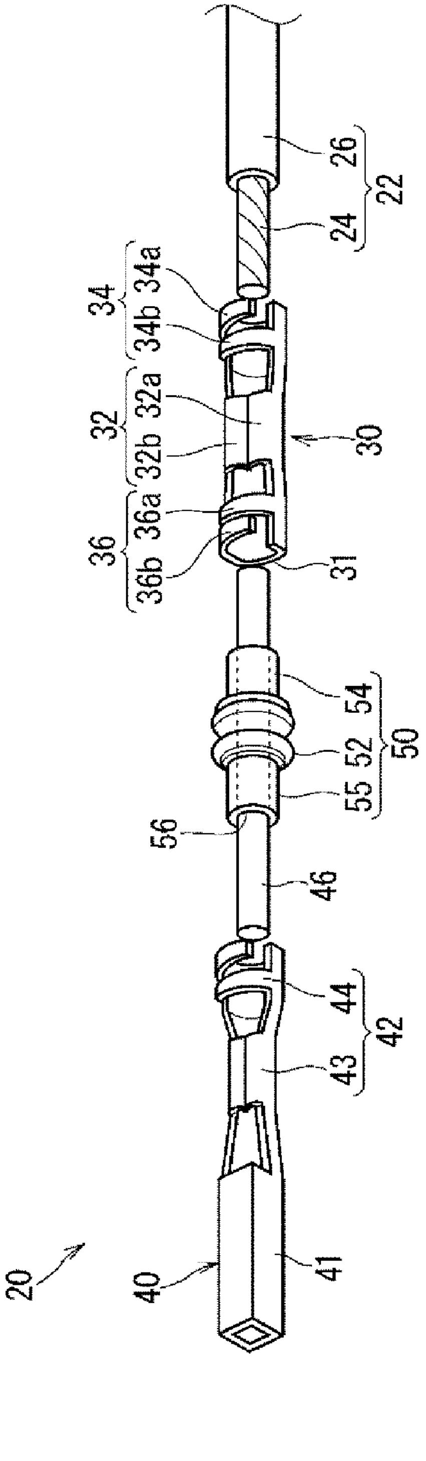
FIG. 3 is an exploded perspective view showing the terminal-equipped electric wire according to Embodiment 1.

The terminal-equipped electric wire 20 according to Embodiment 1 will be described in detail with reference to FIGS. 2 and 3, in addition to FIG. 1. FIG. 2 is a plan view showing the terminal-equipped electric wire 20 according to Embodiment 1. FIG. 3 is an exploded perspective view showing the terminal-equipped electric wire 20 according to Embodiment 1.

The terminal-equipped electric wire 20 includes a coated electric wire 22, a joint terminal 30, a connector terminal 40, a relay conductor 46, and a sealing member 50. The joint terminal 30 is provided at an end portion of the coated electric wire 22. The connector terminal 40 and the relay conductor 46 are provided on the leading end side of the joint terminal 30. The relay conductor 46 is connected to the joint terminal 30 and the connector terminal 40. The joint terminal 30 and the connector terminal 40 are connected to each other via the relay conductor 46. The portion of the coated electric wire 22 that is connected to the joint terminal 30 and the portion of the coated electric wire 22 on the one end side of the portion connected to the joint terminal 30 are housed in the cavity 14. A portion of the coated electric wire 22 on the other end side of the portion connected to the joint terminal extends out of the cavity 14 from the one opening portion.

The coated electric wire 22 has a conductor core wire 24 and an insulation coating 26. Here, the conductor core wire 24 is a stranded wire. The stranded wire is formed by twisting together a plurality of wire strands. The wire strands are made of a material using a conductor such as copper, a copper alloy, aluminum, and an aluminum alloy. The insulation coating 26 covers the conductor core wire 24. The insulation coating 26 is molded by extruding a resin material onto the conductor core wire 24 or formed by applying an insulating paint thereto. The leading end of the conductor core wire 24 protrudes outward of the insulation coating 26, and this protruding portion is a core wire exposed portion.

The joint terminal 30 is connected to the coated electric wire 22 and the relay conductor 46 through crimping. The joint terminal 30 includes a wire barrel 32 and insulation barrels 34 and 36. The wire barrel 32 and the insulation barrels 34 and 36 are open barrels. The wire barrel 32 has a pair of crimping pieces 32*a* and 32*b*. The insulation barrel 34 has a pair of crimping pieces 34*a* and 34*b*. The insulation barrel 36 has a pair of crimping pieces 36*a* and 36*b*. The three pairs of crimping pieces 32*a*, 32*b*, 34*a*, 34*b*, 36*a*, and 36*b* are connected to a bottom portion 31 of the joint terminal 30.

The bottom portion 31 has a flat plate shape or a semi-cylindrical shape. The bottom portion 31 is elongated in one direction. The longitudinal direction of the bottom portion 31 is the longitudinal direction of the joint terminal 30. The three pairs of crimping pieces 32*a* and 32*b*, 34*a* and 34*b*, and 36*a* and 36*b* are aligned in the order of the pairs of crimping pieces 34*a* and 34*b*, crimping pieces 32*a* and 32*b*, and crimping pieces 36*a* and 36*b* from one end side to the other end side in the longitudinal direction of the bottom portion 31. The pair of crimping pieces 32*a* and 32*b* protrude from two sides in the width direction of the bottom portion 31. The same applies to the other pairs of crimping pieces. The width direction of the bottom portion 31 is the width direction of the joint terminal 30. The three pairs of crimping pieces 32*a* and 32*b*, 34*a* and 34*b*, and 36*a* and 36*b* protrude on one side with respect to the bottom portion 31. The direction in which the crimping pieces 32*a*, 32*b*, 34*a*, 34*b*, 36*a*, and 36*b* protrude from the bottom portion 31 is the height direction of the joint terminal 30. The joint terminal 30 is formed by folding a conductor plate, for example.

The wire barrel 32 is crimped to the exposed core wire portion at an end portion of the conductor core wire 24 and the relay conductor 46. The portion where the wire barrel 32 is crimped to the conductor core wire 24 and the relay conductor 46 is a connection portion CP1. The connection portion CP1 is described below in detail.

The insulation barrel 34 is crimped to the insulation coating 26. The portion of the insulation barrel 36 that is crimped to the insulation coating 26 is a coating holding portion. The insulation barrel 36 is crimped to the sealing member 50. The portion of the insulation barrel 36 that is crimped to the sealing member 50 is a sealing member holding portion. The insulation barrels 34 and 36 may be omitted.

The connector terminal 40 includes a partner-side connection portion 41 and a relay conductor connection portion 42. As described above, the partner-side connection portion 41 has a female terminal shape. The partner-side connection portion 41 may have a male terminal shape. The connector terminal 40 is connected to the relay conductor 46 through crimping. The connector terminal 40 is formed by bending a conductor plate, for example. Naturally, the connector terminal 40 may be connected to the relay conductor 46 through welding, pressure welding, or the like.

The partner-side connection portion 41 has a box shape in which the front end portion thereof is open. A male terminal is inserted into the partner-side connection portion 41 via this opening. Spring contacts and the like are provided in the partner-side connection portion 41 as needed. The spring contacts and the like are connected to the male terminal inside the partner-side connection portion 41.

The relay conductor connection portion 42 has a wire barrel 43 and an insulation barrel 44. The wire barrel 43 is crimped to the relay conductor 46. The insulation barrel 44 is crimped to the sealing member 50. The insulation barrel 44 may be omitted from the relay conductor connection portion 42.

The relay conductor 46 is formed as a single-core conductor. The relay conductor 46 has a columnar rod shape. The relay conductor 46 may have a cylindrical rod shape. The relay conductor 46 is longer than the sealing member 50. Two end portions of the relay conductor 46 in the longitudinal direction thereof protrude outward of the sealing member 50. The two end portions of the relay conductor 46 are respectively crimped to the wire barrels 32 and 43. The sealing member 50 covers the intermediate portion of the relay conductor 46 in the longitudinal direction thereof.

The sealing member 50 has a sealing body 52 and crimp portions 54 and 55. The sealing member 50 is provided with a through hole 56. The relay conductor 46 is passed through the through hole 56. The sealing body 52 and the crimp portions 54 and 55 are aligned in the axial direction of the through hole 56. Here, the crimp portion 54 is provided on one side of the sealing body 52 and the crimp portion 55 is provided on the other side. A crimp portion may be provided on only one side of the sealing body 52. One or both of the crimp portions 54 and 55 may be omitted.

The sealing body 52 is a portion that liquid-seals the space between the one opening portion and the other opening portion of the cavity 14 while the terminal-equipped electric wire 20 is inserted into the cavity 14. An annular recess and an annular protrusion are provided on the outer surface of the sealing body 52 so as to be alternately connected to each other in the longitudinal direction. The sealing body 52 is positioned between the joint terminal 30 and the connector terminal 40 in the longitudinal direction. The annular protrusions of the sealing body 52 protrude in a radial direction outward of the joint terminal 30 and the connector terminal 40. The outer radius of the sealing body 52 is set to be the same as or larger than the inner diameter of the cavity 14 at a predetermined sealing position, before the terminal-equipped electric wire 20 is inserted into the cavity 14. When the terminal-equipped electric wire 20 is inserted into the cavity 14, the outer surface of the sealing body 52 is in intimate contact with the inner surface of the cavity 14.

The two crimp portions 54 and 55 are portions that are respectively crimped by the insulation barrels 36 and 44 while covering the relay conductor 46. Thus, the crimp portions 54 and 55 are respectively positioned and held by the joint terminal 30 and the connector terminal 40, and the sealing member 50 is positioned and held by the terminal-equipped electric wire 20. If both crimp portions 54 and 55 are omitted, the relay conductor 46 may be shaped so as to be able to position and hold the sealing member 50. For example, the relay conductor 46 may be provided with an annular groove. By accommodating the sealing member 50 in the annular groove, the sealing member 50 can be positioned and held by the relay conductor 46.

In the housed state, provision of the sealing member 50 liquid-seals the space between the one opening portion and the other opening portion of the cavity 14. The liquid that is to be sealed out by the sealing member 50 is envisioned as being water, oil, or the like. Oil is, for example, oil (hydraulic oil) for performing control operations performed in automatic shifting in an automatic transmission. Liquid-sealing between the one opening portion and the other opening portion of the cavity 14 is realized as described below, for example.

The relay conductor 46 is solid. Thus, liquid is suppressed from moving from one of the two opening portions of the cavity 14, passing through the relay conductor 46, and seeping to the other opening portion. The relay conductor 46 may be hollow. Even if the relay conductor 46 is hollow, provided that one end of the relay conductor 46 in the longitudinal direction is closed off, liquid is suppressed from moving from one of the two opening portions of the cavity 14, passing through the relay conductor 46, and seeping to the other opening portion.

The inner surface of the sealing body 52 (inner circumferential surface of through hole 56) is circular in shape. In the housed state, the inner surface of the sealing body 52 is in intimate contact with the outer surface of the relay conductor 46 over the entire circumferential direction thereof. Thus, the sealing body 52 suppresses a liquid from moving from one of the two opening portions of the cavity 14, moving along the relay conductor 46, and seeping to the other opening portion. Note that it is sufficient that the entire circumference of at least a portion of the inner surface of the sealing body 52 in the longitudinal direction is in intimate contact with the outer surface of the relay conductor 46. The inner surface of the sealing body 52 may be smaller than the outer surface of the relay conductor 46 before being mounted to the relay conductor 46. In the housed state, the inner surface of the sealing body 52 may press against the outer surface of the relay conductor 46 under pressure from the cavity 14.

The outer surfaces of the annular protrusions of the sealing body 52 are circular in shape. In the housed state, the entire circumferences of the outer surfaces of the annular protrusions of the sealing body 52 are in intimate contact with the inner surface of the cavity 14 at the sealing position. Thus, a liquid is suppressed from moving from one of the two opening portions of the cavity 14, passing between the sealing body 52 and the connector housing 10, and seeping to the other opening portion.

Connection Portion CP1

Figure 4:
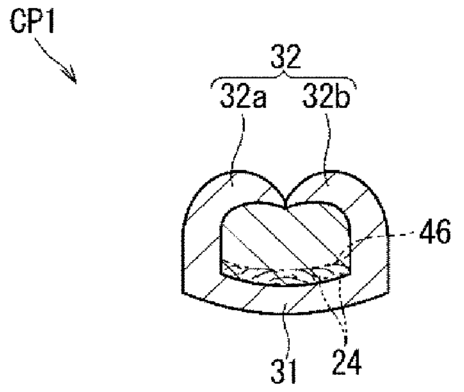
FIG. 4 is a cross-sectional view taken along line IV-IV in FIG. 2.
Figure 5:
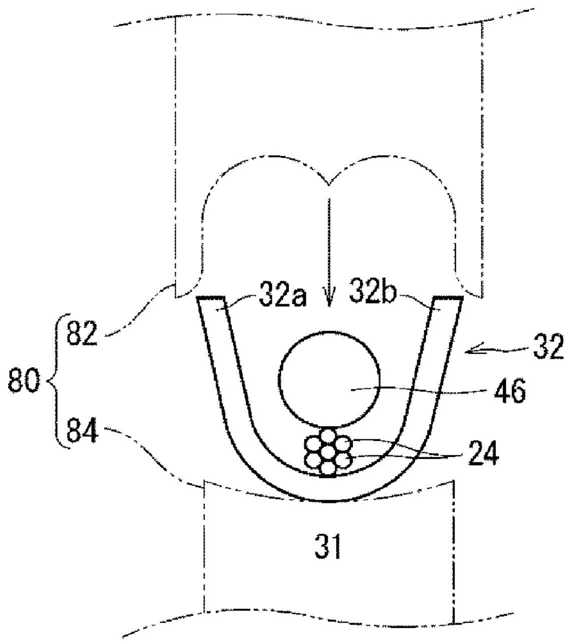
FIG. 5 is a descriptive diagram showing a conductive core wire and a relay conductor being connected to a joint terminal.

The connection portion CP1 will be described in detail with reference to FIGS. 4 and 5. FIG. 4 is a cross-sectional view taken along line IV-IV in FIG. 2, and is a cross-sectional view showing the connection portion CP1. FIG. 5 is a descriptive diagram showing the conductor core wire 24 and the relay conductor 46 being connected to the joint terminal 30. FIG. 4 shows the wire barrel 32 in a crimped state. FIG. 5 shows the wire barrel 32 in a non-crimped state.

One wire barrel 32 is crimped to the conductor core wire 24 and the relay conductor 46, thus forming the connection portion CP1. The wire barrel 32 of the joint terminal 30 is crimped to the conductor core wire 24 and the relay conductor 46 at the same position in the longitudinal direction of the joint terminal 30. The conductor core wire 24 extends from the one wire barrel 32 to one side in the longitudinal direction of the joint terminal 30, while the relay conductor 46 extends to the other side. Here, the conductor core wire 24 and the relay conductor 46 are aligned in the height direction of the joint terminal 30, at the portion to which the wire barrel 32 is crimped. Here, out of the conductor core wire 24 and the relay conductor 46, the conductor core wire 24 is located on the bottom portion 31 side. The leading end portions of the pair of crimping pieces 32*a* and 32*b* are abutted against each other while covering the conductor core wire 24 and the relay conductor 46.

As shown in FIG. 5, the connection portion CP1 can be formed by using a crimping die 80 to perform crimping. The crimping die 80 includes a crimper 82 and an anvil 84. The crimper 82 and the anvil 84 are aligned in one direction. The crimper 82 and the anvil 84 are supported so as to be able to move closer and farther away from each other in this direction in a terminal crimping machine. The joint terminal 30 is positioned such that the height direction of the joint terminal 30 matches the direction in which the crimper 82 and the anvil 84 are aligned when crimping is performed. The crimper 82 and the anvil 84 approach each other in the height direction of the joint terminal 30 and crimp the joint terminal 30. The crimper 82 is provided with guiding surfaces for bending and deforming the leading end portions of the pair of crimping pieces 32*a* and 32*b*. After the leading end portions of the pair of crimping pieces 32*a* and 32*b* have come into contact with the guiding surfaces, the crimping pieces 32*a* and 32*b* are deformed so as to follow the inner surface of the corresponding guiding surface and collapse inward. While the crimper 82 is bending and deforming the pair of crimping pieces 32*a* and 32*b*, the anvil 84 supports the outer surface of the bottom portion 31 (bottom surface on the sheet of FIG. 5).

As shown in FIG. 5, crimping is started with, out of the conductor core wire 24 and the relay conductor 46, the conductor core wire 24 located on the bottom portion 31 side between the pair of crimping pieces 32*a* and 32*b*. At this time, the single relay conductor 46 covers the conductor core wire 24 from above. Accordingly, the wire strands of the conductor core wire 24 are suppressed from partially protruding out of the wire barrel 32 from between the pair of crimping pieces 32*a* and 32*b* when crimping is performed.

The wire strands of the conductor core wire 24 and the relay conductor 46 prior to crimping are columnar in shape. The pre-crimping pair of crimping pieces 32*a* and 32*b* of the wire barrel 32 protrude upward from the bottom portion 31. Thus, a space is open between the pair of crimping pieces 32*a* and 32*b* of the pre-crimping wire barrel 32. The leading end portions of the pair of crimping pieces 32*a* and 32*b* of the crimped wire barrel 32 are bent and deformed and the opening is closed. The crimped wire barrel 32 is deformed into a shape that corresponds to the shape of the crimping die

80. Following deformation of the wire barrel 32, the wire strands of the conductor core wire 24 and the relay conductor 46 after crimping are crushed by the wire barrel 32 and deform into a shape that corresponds to the inner surface of the wire barrel 32. FIG. 4 is a schematic diagram showing the wire strands of the conductor core wire 24 and the relay conductor 46, which are indicated by the double-dot-dash lines, in a crimped state. The wire strands of the conductor core wire 24 enter a state where some of the strands overlap each other while being spread out in a width direction of the bottom portion 31, for example.

Figure 6:
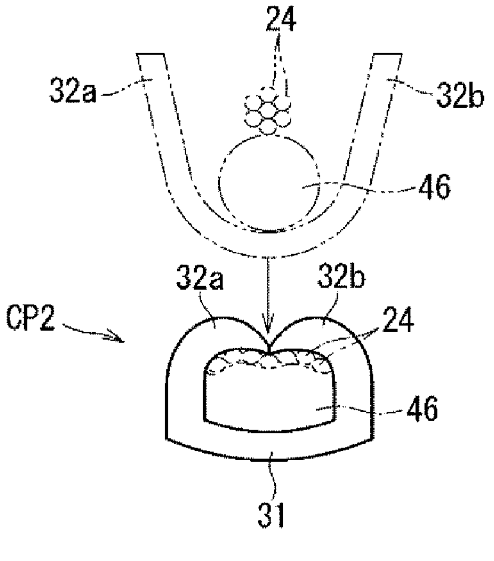
FIG. 6 is a descriptive diagram showing a modification example of a connection portion of the conductive core wire and the relay conductor.

FIG. 6 is a descriptive diagram showing a modification example of the connection portion CP1 of the conductor core wire 24 and the relay conductor 46. In FIG. 6, the wire barrel 32 indicated by the solid line and the conductor core wire 24 and the relay conductor 46 inside the wire barrel 32 and indicated by the double-dot-dash lines are shown in a crimped state. In FIG. 6, the wire barrel 32 indicated by a double-dot-dash line and the conductor core wire 24 and the relay conductor 46 inside the wire barrel 32 and indicated by the double-dot-dash lines are shown in a pre-crimping state.

Similar to the connection portion CP1 shown in FIG. 4, in the connection portion CP2 shown in FIG. 6 as well, the conductor core wire 24 and the relay conductor 46 are aligned in the height direction of the joint terminal 30 at the portion where they are crimped by the wire barrel 32. In the connection portion CP2 shown in FIG. 6, the relay conductor 46, out of the conductor core wire 24 and the relay conductor 46, is located on the bottom portion 31 side. Such a connection portion CP2 is formed by starting crimping with the relay conductor 46, out of the conductor core wire 24 and the relay conductor 46, being located on the bottom portion 31 side between the pair of crimping pieces 32*a* and 32*b*.

Figure 7:
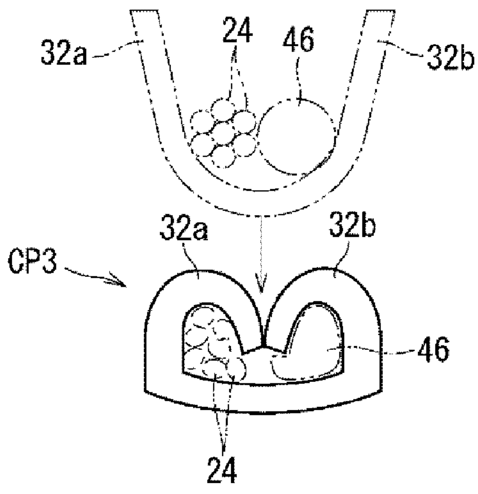
FIG. 7 is a descriptive diagram showing another modification example of the connection portion of the conductive core wire and the relay conductor.

FIG. 7 is a descriptive diagram showing another modification example of the connection portion CP1 of the conductor core wire 24 and the relay conductor 46. In FIG. 7, the wire barrel 32 indicated by the solid line and the conductor core wire 24 and the relay conductor 46 inside the wire barrel 32 and indicated by the double-dot-dash lines are shown in a crimped state. In FIG. 7, the wire barrel 32 indicated by a double-dot-dash line and the conductor core wire 24 and the relay conductor 46 inside the wire barrel 32 and indicated by the double-dot-dash lines are shown in a pre-crimping state.

In a connection portion CP3 shown in FIG. 7, the conductor core wire 24 and the relay conductor 46 are aligned in the width direction of the joint terminal 30 at the portion of the joint terminal 30 to which the wire barrel 32 is to be crimped. In the connection portion CP3 shown in FIG. 7, the one crimping piece 32*a* of the pair of crimping pieces 32*a* and 32*b* is wrapped around the conductor core wire 24. The other crimping piece 32*b* of the pair of crimping pieces 32*a* and 32*b* is wrapped around the relay conductor 46. Such a connection portion CP3 is formed by starting crimping with the relay conductor 46 and the conductor core wire 24 being aligned in the width direction between the pair of crimping pieces 32*a* and 32*b*.

With the connection portion CP3 in which the conductor core wire 24 and the relay conductor 46 are aligned in the width direction of the joint terminal 30, if the conductor sizes (conductor cross-sections) differ between the conductor core wire 24 and the relay conductor 46, one of the pair of crimping pieces 32*a* and 32*b* is wrapped around the smaller conductor. The larger conductor may jut out from the other of the pair of crimping pieces 32*a* and 32*b*. A portion of the larger conductor may be covered by one of the pair of crimping pieces 32*a* and 32*b* or one of the crimping pieces may bite thereinto.

Effects, Etc. Of Embodiment 1

With the terminal-equipped electric wire 20 and the connector-equipped electric wire 1 configured as described above, the wire barrel 32 of the joint terminal 30 is crimped to the conductor core wire 24 and the relay conductor 46 at the same position in the longitudinal direction of the joint terminal 30. Thus, compared to a configuration in which separate wire barrels are respectively crimped to the conductor core wire 24 and the relay conductor 46 at different positions in the longitudinal direction of the joint terminal 30, the joint terminal 30 can be made shorter. Thus, the length of the portion of the terminal-equipped electric wire 20 that is disposed in the cavity 14 of the connector housing 10 can be shortened.

In the case where a connector is connected to a vibration device such as a transmission, the terminal-equipped electric wire 20 and the connector housing 10 rattle when the vibration device vibrates. At this time, if the magnitude of the rattling increases, the inner or outer surface of the sealing member 50 may cease to be in intimate contact with the corresponding partner member. Also, if stress concentrated on the conductor portions increases, the conductor portions may break or metal fatigue may progress. By shortening the portion of the terminal-equipped electric wire 20 that is disposed in the cavity 14, large rattling between the terminal-equipped electric wire 20 and the connector 10 when vibration occurs can be suppressed. Accordingly, a reduction in the sealing properties and an increase in stress concentrated on the conductor portions can be suppressed.

By shortening the portion of the terminal-equipped electric wire 20 that is disposed in the cavity 14, the operation of inserting the terminal-equipped electric wire 20 into the cavity 14 can be performed with ease. Also, by shortening the cavity 14 itself, the size of the connector can be reduced.

Here, the portion of the terminal-equipped electric wire 20 that is rearward of the sealing member 50 (portion on coated electric wire 22 side) is shortened. Thus, the amount by which the sealing member 50 is moved from the one opening portion of the cavity 14 to a predetermined position of the sealing member 50 is reduced. Thus, the terminal-equipped electric wire 20 is easy to insert.

Also, in the connection portions CP1 and the CP2, the conductor core wire 24 and the relay conductor 46 are aligned in the height direction of the joint terminal 30 at the portion where they are crimped by the wire barrel 32. Accordingly, the conductor core wire 24 and the relay conductor 46 can be aligned in the crimping direction. Also, in the connection portion CP1, the conductor core wire 24, out of the conductor core wire 24 and the relay conductor 46, is located on the bottom portion 31 side of the joint terminal 30. Accordingly, the relay conductor 46 can cover the conductor core wire 24 from above.

Also, in the connection portion CP3, the conductor core wire 24 and the relay conductor 46 are aligned in the width direction of the joint terminal 30 at the portion where they are crimped by the wire barrel 32. Accordingly, the conductor core wire 24 and the relay conductor 46 can be aligned in a direction that is orthogonal to the crimping direction. Also, in the connection portion CP3, one crimping piece 32*a* of the pair of crimping pieces 32*a* and 32*b* is wrapped around the conductor core wire 24 and the other crimping piece 32*b* of the pair of crimping pieces 32*a* and 32*b* is wrapped around the relay conductor 46. Thus, the conductor core wire 24 and the relay conductor 46 can be respectively crimped by different crimping pieces 32*a* and 32*b*.

Embodiment 2

Figure 8:
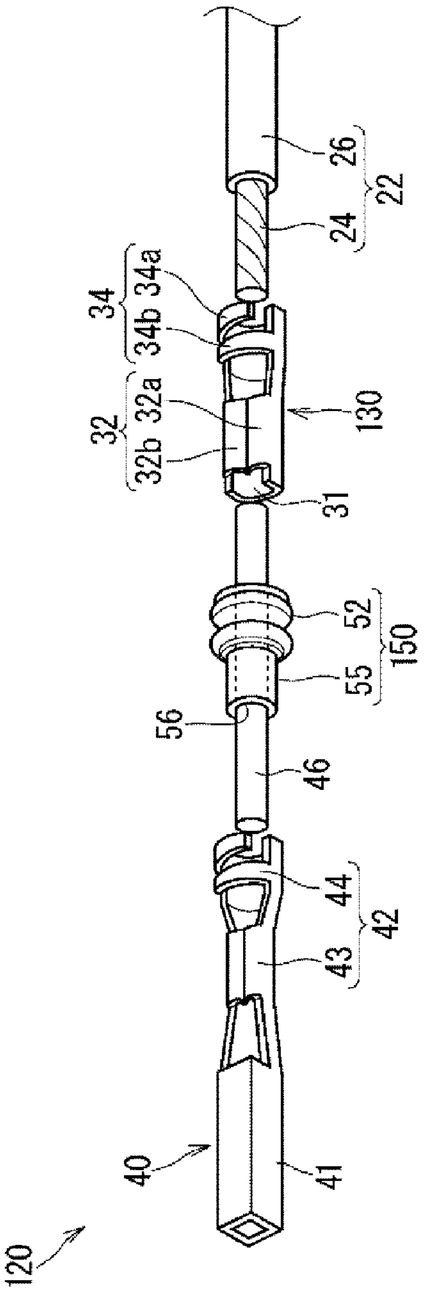
FIG. 8 is an exploded perspective view showing a terminal-equipped electric wire according to Embodiment 2.

A terminal-equipped electric wire according to Embodiment 2 will be described. FIG. 8 is an exploded perspective view showing a terminal-equipped electric wire 120 according to Embodiment 2. Note that, in the following description, constituent elements similar to those thus described are given like reference signs and description thereof is omitted.

In the terminal-equipped electric wire 120, the shape of a sealing member 150 differs from the shape of the sealing member 50 of the terminal-equipped electric wire 20. The sealing member 150 is provided with one crimp portion 55. The crimp portion 55 is provided on one side of the sealing body 52. The crimp portion 55 is crimped to either one of a joint terminal 130 and the connector terminal 40. Accordingly, compared to a case where the crimp portions 54 and 55 are provided on two sides of the sealing body 52 and the crimp portions 54 and 55 on the two sides are respectively crimped to the joint terminal 130 and the connector terminal 40, the sealing member 150 can be made shorter. Thus, the length of the portion of the terminal-equipped electric wire 120 that is disposed in the cavity 14 of a connector housing 10 can be shortened.

Here, the crimp portion 55 is provided on the connector terminal 40 side. The crimp portion 55 is crimped to the connector terminal 40, out of 0 40. Thus, the sealing member 150 has the shape of the above sealing member 50 without the crimp portion 54. Also, the joint terminal 130 of the terminal-equipped electric wire 120 has the shape of the joint terminal 30 without the insulation barrel 36. The joint terminal 130 includes the wire barrel 32 and the insulation barrel 34. Thus, the joint terminal 130 side of the sealing body 52 is shortened in the terminal-equipped electric wire 120. Accordingly, the amount by which the sealing member 150 is moved when the terminal-equipped electric wire 120 is inserted into the cavity 14 is reduced. Accordingly, it is easy to insert the terminal-equipped electric wire 120 into the cavity 14.

The one crimp portion of the sealing member may be provided on the joint terminal 30 side. The sealing member in this case has the shape of the above sealing member 50 without the crimp portion 55. Also, the connector terminal in this case has the shape of the above connector terminal 40 without the insulation barrel 44.

Supplementary Notes

Figure 9:
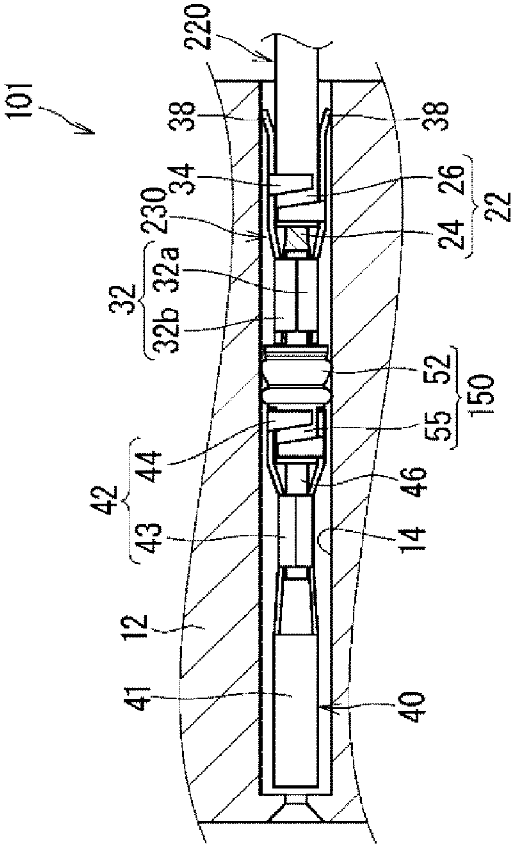
FIG. 9 is a cross-sectional view showing a modification example of a terminal-equipped electric wire.

FIG. 9 is a cross-sectional diagram showing another modification example of the terminal-equipped electric wire.

According to the modification example shown in FIG. 9, in a terminal-equipped electric wire 220 and a connector-equipped electric wire 101 including the same, the shape of a joint terminal 230 differs from the shapes of the joint terminals 30 and 130. Specifically, the joint terminal 230 is provided with protrusions 38. Apart from the terminal-equipped electric wire 220 being provided with the protrusions 38, the configuration of the terminal-equipped electric wire 220 is the same as that of the terminal-equipped electric wire 120.

The protrusions 38 are formed so as to abut against the inner circumferential surface of the cavity 14 in the housed state. The protrusions 38 abut against the inner circumferential surface of the cavity 14. Thus, the joint terminal 230 is supported by the housing body 12. The protrusions 38 are formed so as to protrude in a radial direction outward of the wire barrel 32 and the insulation barrel 34. In the example shown in FIG. 9, the protrusions 38 are provided on the rear end portion side of the joint terminal 230 relative to the insulation barrel 34. The protrusions 38 may be provided at any position of the joint terminal 230. For example, the protrusions 38 may be provided between the wire barrel 32 and the insulation barrel 34. Also, for example, the protrusions 38 may be provided on the leading end side relative to the wire barrel 32.

In the example shown in FIG. 9, the protrusions 38 are provided so as to protrude on two sides of the joint terminal 230. The protrusions 38 may be provided so as to protrude downward of the joint terminal 230. The protrusions 38 may be provided to protrude in three directions, namely on two sides and downward of the joint terminal 230. The protrusions 38 may be formed to protrude in a radial direction outward of the sealing body 52. The protrusions 38 may also be formed by bending a conductor plate as is the case with the wire barrel 32 and the insulation barrel 34.

The protrusions 38 may elastically deform so as to collapse in the radial direction, when subjected to a force from the inner surface of the cavity 14 in the housed state. For example, the protrusions 38 can have a spring shape such as a leaf spring shape and thus be elastically deformable so as to be able to collapse in the radial direction of the cavity 14. Also, the protrusions 38 are formed larger than the portion of the cavity 14 where the protrusions 38 abut against the cavity 14, prior to being housed in the cavity 14. In this case, as shown in FIG. 9, the protrusions 38 may be formed having a portion that gradually protrudes outward in the radial direction while extending toward the rear end side. Thus, when the protrusions 38 are housed in the cavity 14, the protrusions 38 are likely to deform in a direction in which they collapse when subjected to a force from the inner surface of the cavity 14.

Note that the configurations of the embodiments and modification examples can be combined as appropriate as long as no contradiction arises.

LIST OF REFERENCE NUMERALS

- 1, 101 Connector-equipped electric wire
- 10 Connector housing
- 12 Housing body
- 14 Cavity
- 16 Vehicle attachment portion
- 17 Mounting hole
- 28 Seal member mounting portion
- 20, 120, 220 Terminal-equipped electric wire
- 22 Coated electric wire
- 24 Conductor core wire
- 26 Insulation coating
- 30, 130, 230 Joint terminal
- 31 Bottom portion
- 32, 43 Wire barrel
- 32*a*, 32*b*, 34*a*, 34*b*, 36*a*, 36*b* Crimping piece
- 34, 36, 44 Insulation barrel
- 38 Protrusion
- 40 Connector terminal
- 41 Partner-side connection portion
- 42 Relay conductor connection portion
- 46 Relay conductor
- 50, 150 Sealing member
- 52 Sealing body
- 54, 55 Crimp portion

56 Through hole
80 Crimping die
82 Crimper
84 Anvil
S Seal member
CP1, CP2, CP3 Connection portion

What is claimed is:

1. A terminal-equipped electric wire comprising:
a coated electric wire including a conductor core wire and an insulation coating that covers the conductor core wire;
a joint terminal connected to the conductor core wire;
a connector terminal to be connected to a partner terminal;
a single-core relay conductor in which one end thereof is connected to the joint terminal and another end thereof is connected to the connector terminal; and
a sealing member that covers an intermediate portion of the relay conductor,
wherein the joint terminal includes a wire barrel and an insulation barrel,
the wire barrel is crimped to the conductor core wire and the relay conductor at the same position in a longitudinal direction of the joint terminal,
the insulation barrel is crimped to the insulation coating,
the conductor core wire and the relay conductor are aligned in a height direction of the joint terminal at a portion where the conductor core wire and the relay conductor are crimped by the wire barrel, and
wherein the wire barrel includes a pair of crimping pieces that protrude from a bottom portion of the joint terminal in the height direction of the joint terminal.

2. The terminal-equipped electric wire according to claim 1,
wherein the conductor core wire is a stranded wire formed by twisting together a plurality of wire strands, and the single-core relay conductor and the conductor core wire that is the stranded wire are brought into contact with each other and crimped.

3. The terminal-equipped electric wire according to claim 1,
wherein the sealing member includes a sealing body that is contactable with an inner surface of a cavity of a connector housing, and a crimp portion that is provided on one side of the sealing body, and
the crimp portion is crimped to one of the joint terminal and the connector terminal.

4. A terminal-equipped electric wire comprising:
a coated electric wire including a conductor core wire and an insulation coating that covers the conductor core wire;
a joint terminal connected to the conductor core wire;
a connector terminal to be connected to a partner terminal;
a single-core relay conductor in which one end thereof is connected to the joint terminal and another end thereof is connected to the connector terminal; and
a sealing member that covers an intermediate portion of the relay conductor,
wherein the joint terminal includes a wire barrel and an insulation barrel,
wherein the wire barrel is crimped to the conductor core wire and the relay conductor at the same position in a longitudinal direction of the joint terminal,
the insulation barrel is crimped to the insulation coating, and
the conductor core wire and the relay conductor are aligned in a height direction of the joint terminal at a portion where the conductor core wire and the relay conductor are crimped by the wire barrel,
wherein the conductor core wire is a stranded wire formed by twisting together a plurality of wire strands, and the single-core relay conductor and the conductor core wire that is the stranded wire are brought into contact with each other and crimped,
wherein the plurality of wire strands spread out in a width direction of the joint terminal around the relay conductor,
the wire barrel includes a pair of crimping pieces that protrude from a bottom portion of the joint terminal in the height direction of the joint terminal, and
the wire barrel is crimped to the conductor core wire and the relay conductor such that the pair of crimping pieces come into contact with outer wire strands of the wire strands in the width direction.

5. The terminal-equipped electric wire according to claim 4,
wherein the plurality of wire strands and the single-core relay conductor are crushed by the wire barrel and deformed into a shape corresponding to an inner surface of the wire barrel.

6. The terminal-equipped electric wire according to claim 4,
wherein each of the plurality of wire strands is thinner than the single-core relay conductor.

7. The terminal-equipped electric wire according to claim 6,
wherein the conductor core wire, out of the conductor core wire and the relay conductor, is located on a bottom portion side of the joint terminal.

8. The terminal-equipped electric wire according to claim 4,
wherein the wire barrel and the insulation barrel are separated from each other in the longitudinal direction, and
a leading end of the relay conductor is located between the wire barrel and the insulation barrel in the longitudinal direction.

9. The terminal-equipped electric wire according to claim 8,
wherein a leading end of the insulation coating is located between the leading end of the relay conductor and the insulation barrel in the longitudinal direction.

10. A connector-equipped electric wire comprising:
a connector housing provided with a cavity, and
the terminal-equipped electric wire according to claim 4 housed in the cavity.

* * * * *